United States Patent [19]
Yamagiwa et al.

[11] Patent Number: 5,724,850
[45] Date of Patent: Mar. 10, 1998

[54] REAR FORK FOR A MOTORCYCLE

[75] Inventors: Toshio Yamagiwa; Hiroki Makino, both of Saitama, Japan

[73] Assignee: Honda Giken Kogyo Kabushiki Kaisha, Tokyo, Japan

[21] Appl. No.: 568,553

[22] Filed: Dec. 7, 1995

Related U.S. Application Data

[63] Continuation-in-part of Ser. No. 217,891, Mar. 25, 1994, abandoned.

[30] Foreign Application Priority Data

Mar. 26, 1993 [JP] Japan ................... 5-090584

[51] Int. Cl.$^6$ ................................. B21K 21/12
[52] U.S. Cl. ............................. 72/370; 72/356
[58] Field of Search ......................... 180/219, 311, 180/312, 227; 280/281.1, 283, 284; 72/340, 391.2, 306, 325, 356, 358, 367, 370, 316, 318; 29/894.362

[56] References Cited

U.S. PATENT DOCUMENTS

| | | | |
|---|---|---|---|
| 1,151,753 | 8/1915 | Bates | 29/894.362 |
| 2,027,922 | 1/1936 | McNaught | 72/325 |
| 3,508,428 | 4/1970 | Matson | 72/370 |
| 4,301,672 | 11/1981 | Simon | 72/370 |
| 4,454,745 | 6/1984 | Cudini | 72/370 |
| 4,594,874 | 6/1986 | Bononi et al. | 72/325 |
| 4,782,679 | 11/1988 | Bögel | 72/370 X |
| 5,203,194 | 4/1993 | Marquardt | 72/370 X |

FOREIGN PATENT DOCUMENTS

| | | | |
|---|---|---|---|
| 0164161 | 12/1985 | European Pat. Off. | 72/391.2 |
| 3742496 | 6/1988 | Germany | 72/370 |
| 54-9153 | 1/1979 | Japan | 72/356 |
| 0159919 | 9/1983 | Japan | 72/391.2 |
| 59-120329 | 7/1984 | Japan | 72/370 |
| 199531 | 10/1985 | Japan . | |
| 60-199531 | 10/1985 | Japan . | |
| 63-38089 | 2/1988 | Japan . | |
| 138716 | 8/1989 | Japan . | |
| 1058676 | 12/1983 | U.S.S.R. | 72/316 |
| 193934 | 2/1988 | United Kingdom . | |

*Primary Examiner*—Lowell A. Larson
*Attorney, Agent, or Firm*—Birch, Stewart, Kolasch & Birch, LLP

[57] ABSTRACT

The present invention provides a pivot pipe for a rear fork of a motorcycle, capable of being formed at comparatively low cost by a simple process. The pivot pipe has a lightweight, strong construction and does not vary widely in quality from one pivot pipe to another. The pivot pipe is connected to a right swing arm and a left swing arm and includes a first end supported on a needle bearing mounted on a pivot shaft and a second end having an inside diameter greater than that of the first end supported on a ball bearing mounted on the pivot shaft. The pivot pipe is formed by expanding one end of a single pipe by press working.

15 Claims, 7 Drawing Sheets

REAR FORK FOR A MOTORCYCLE

This application is a Continuation-In-Part of application Ser. No. 08/217,891, filed on Mar. 25,1994, now abandoned.

BACKGROUND OF THE INVENTION

1. Field of the Invention

The present invention relates to a rear fork for a motorcycle and, more particularly, to the pivot pipe of a rear fork, to be joined pivotally to the body of a motorcycle to connect the rear fork pivotally to the body.

2. Description of Background Art

The rear wheel of a motorcycle is supported on a rear fork pivotally joined to the body of the motorcycle. Generally, the rear fork, as mentioned in, for example, Japanese Patent Publication (Kokoku) No. 1-38716, comprises a right and a left swing member, i.e., swing arms, a cross member extending between the front parts of the right and the left swing member, and a shaft member, i.e., a pivot pipe, extending between the respective front ends of the right and the left swing member. The pivot pipe is supported pivotally on the body of a motorcycle so that the rear fork is able to swing on the body, and the rear wheel is supported on the rear end of the rear fork.

Figure 1:
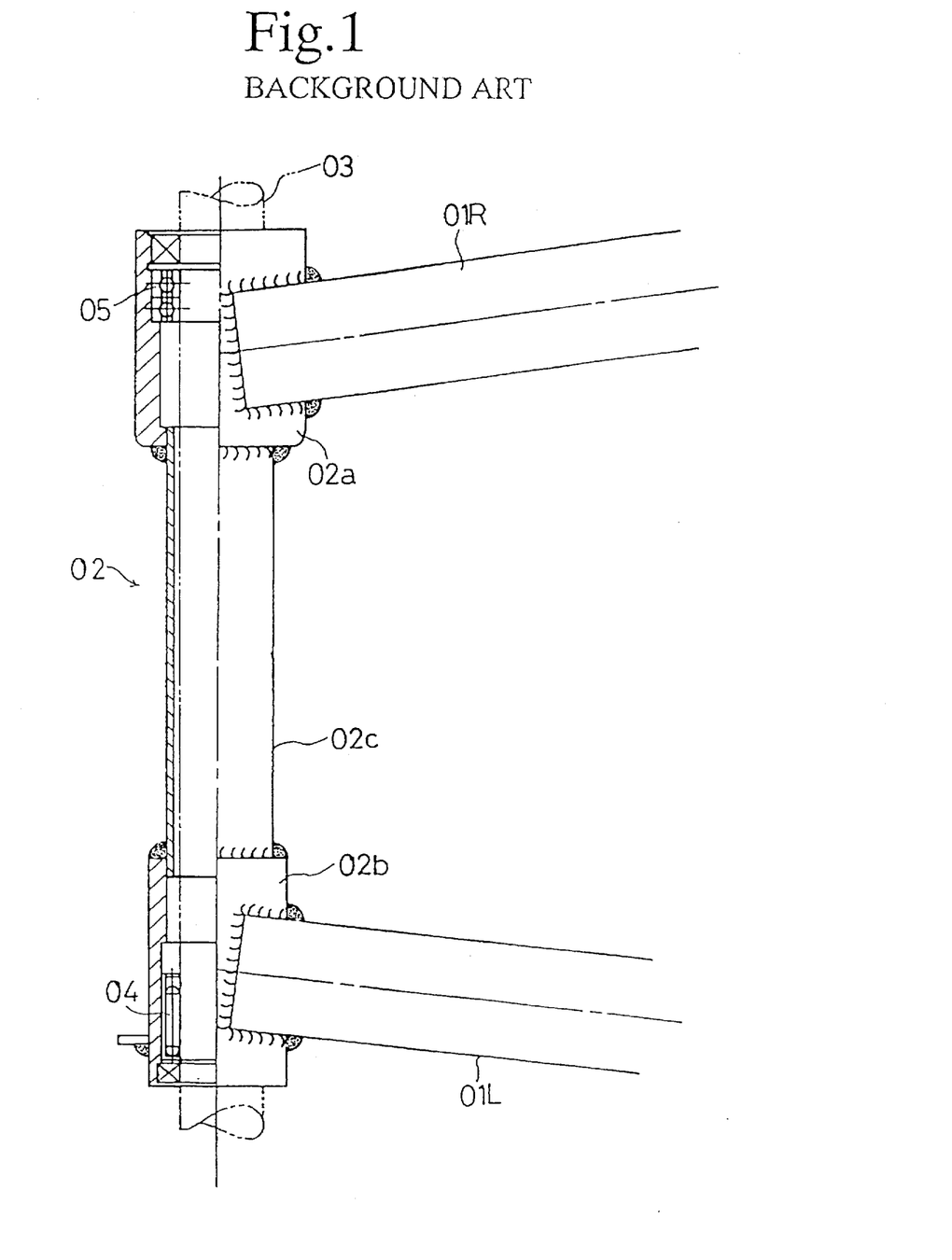
FIG. 1 is a partly cutaway plan view of the pivot pipe of a conventional rear fork.

FIG. 1 illustrates a pivot pipe of a conventional rear fork, a pivot pipe 02 is joined to the front ends of the front portion O1R of a right swing arm and the front portion O1L of a left swing arm, and is supported pivotally on bearings mounted on a pivot shaft 03 joined to the body of a motorcycle.

As illustrated in FIG. 1, one of the bearings supporting the pivot pipe 02 is a needle bearing 04 and the other is a ball bearing 05 because of the following reason. Since the driving chain for driving the rear wheel extends on the left side of the body of the motorcycle provided with this rear fork, a reaction force that acts on the left end of the pivot pipe 02 is greater than that acting on the right end of the same. Therefore, the needle bearing 04 having a comparatively large pressure bearing area is used for supporting the left end of the pivot pipe 02, and the ball bearing 05 capable of accurately positioning the pivot pipe 02 relative to the pivot shaft 03 is used for supporting the right end of the pivot pipe 02.

Therefore, the right end of the pivot pipe 02 has an inside diameter greater than that of the left end of the same. This pivot pipe is fabricated by welding a pipe 02a having a comparatively large diameter suitable for receiving the ball bearing 05 and a pipe 02b having a comparatively small diameter suitable for receiving the needle bearing 04 to the opposite ends of a pipe 02c, respectively.

Such a composite pivot pipe fabricated by welding a plurality of parts requires much time and labor for making the parts and welding the parts together and increases the cost. It is often the case that a plurality of pivot pipes having such a composite construction fabricated by welding parts together each differ in quality one from the other.

SUMMARY OF THE INVENTION

The present invention overcomes the foregoing problems, and it is therefore, an object of the present invention to provide a rear fork for a motorcycle, including a pivot pipe, to which right and left swing arms are joined, having a first end positioned on a ball bearing mounted on a pivot shaft and the other end having an inside diameter smaller than that of the first end and positioned on a needle bearing mounted on the pivot shaft. The pivot pipe of the present invention is fabricated by expanding one end of a pipe by press working.

The pivot pipe of the present invention can be fabricated by a simple process of press working a single pipe at comparatively low costs to produce a lightweight construction. Since the pivot pipe is not strained by welding heat, the quality of the pivot pipe does not vary widely, and the pivot pipe has a high strength.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
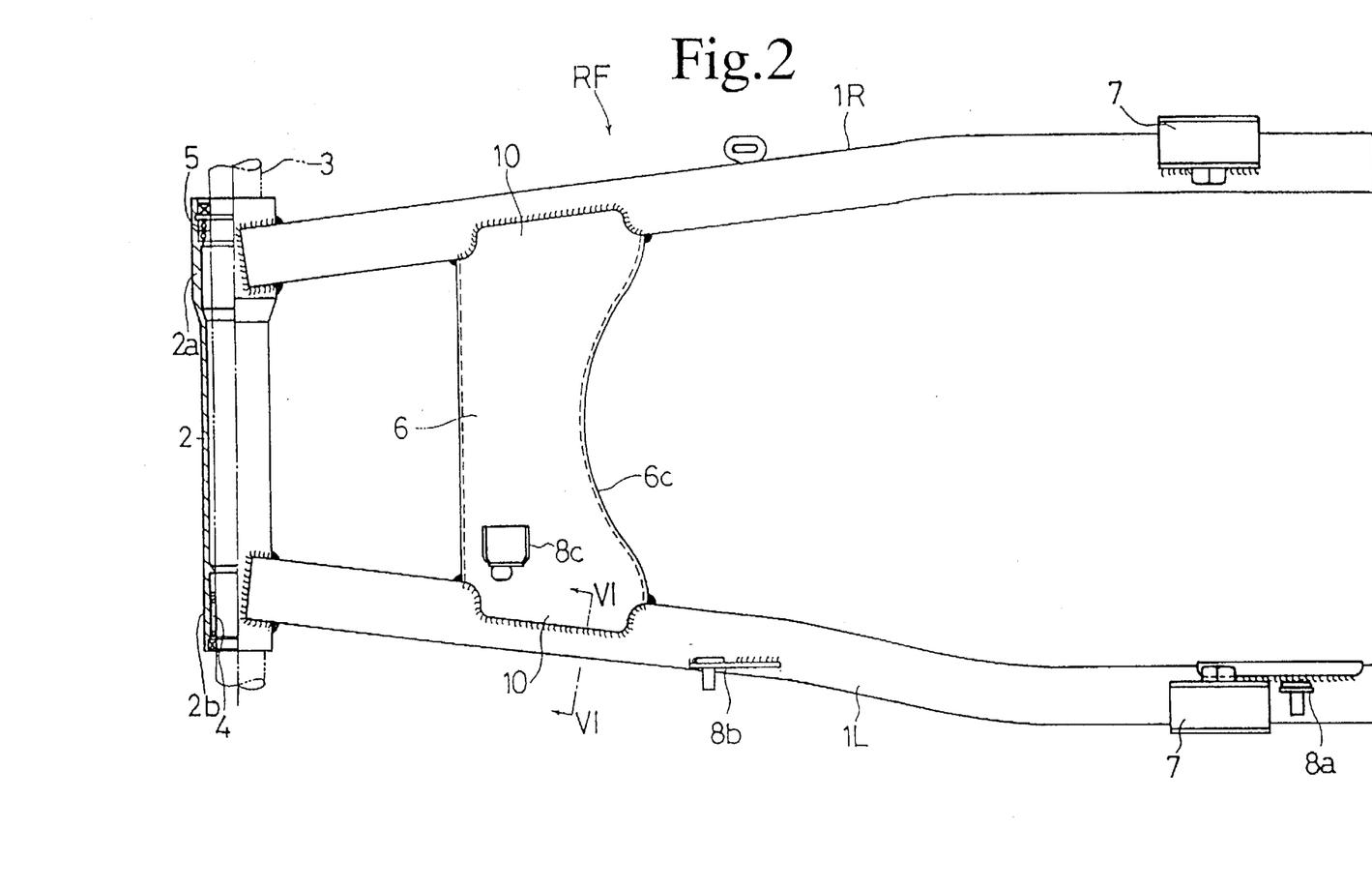
FIG. 2 is a partly cutaway plan view of a rear fork in a first embodiment according to the present invention.
Figure 3:
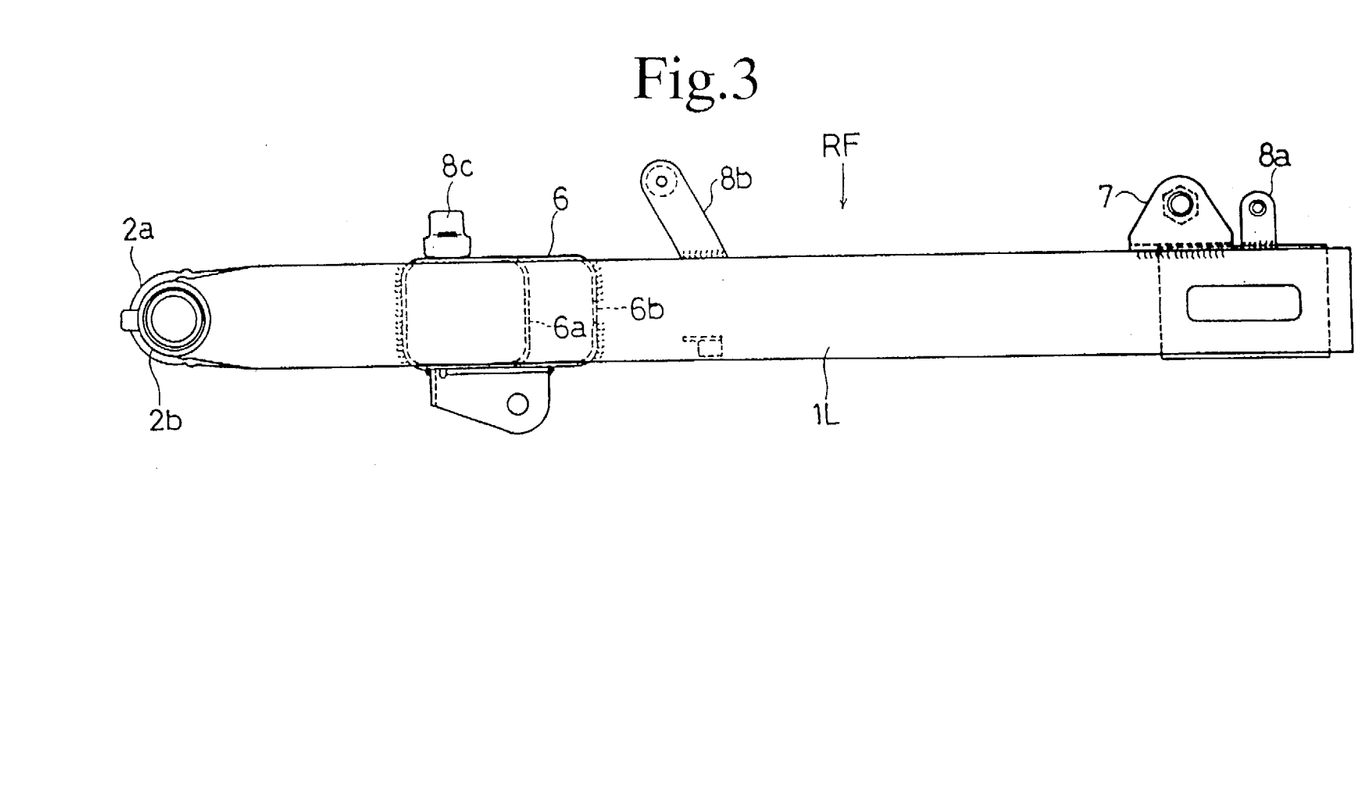
FIG. 3 is a side view of the rear fork of FIG. 2.

FIG. 2 is a plan view of a rear fork RF in a preferred embodiment according to the present invention for a motorcycle and FIG. 3 is a side view of the rear fork RF of FIG. 2. The rear fork RF comprises a pivot pipe 2, a right swing arm 1R joined at its front end to the pivot pipe 2 and a left swing arm 1L joined at its front end to the pivot pipe 2. A cross member 6, disposed behind the pivot pipe 2, extends between the right swing arm 1R and the left swing arm 1L and includes opposite ends joined to the right swing arm 1R and the left swing arm 1L, respectively. The pivot pipe 2 is supported pivotally on a pivot shaft 3 fixed to the body, and the rear end of the rear fork RF is connected to the body extending above the rear fork RF by rear shock absorbers, not shown. The lower ends of the shock absorbers are connected respectively to brackets 7.

A chain case, not shown, is fastened to brackets 8a and 8b attached to the upper surface of the left swing arm 1L, and a bracket 8c attached to a left part of the upper surface of the cross member 6. In the motorcycle provided with this rear fork RF, a driving chain for driving the rear wheel extends along the inner side of the left swing arm 1L. Therefore, as mentioned above, a needle bearing 4 is fitted in the left end of the pivot pipe 2, and a ball bearing 5 is fitted in the right end of the pivot pipe 2.

Figure 4:
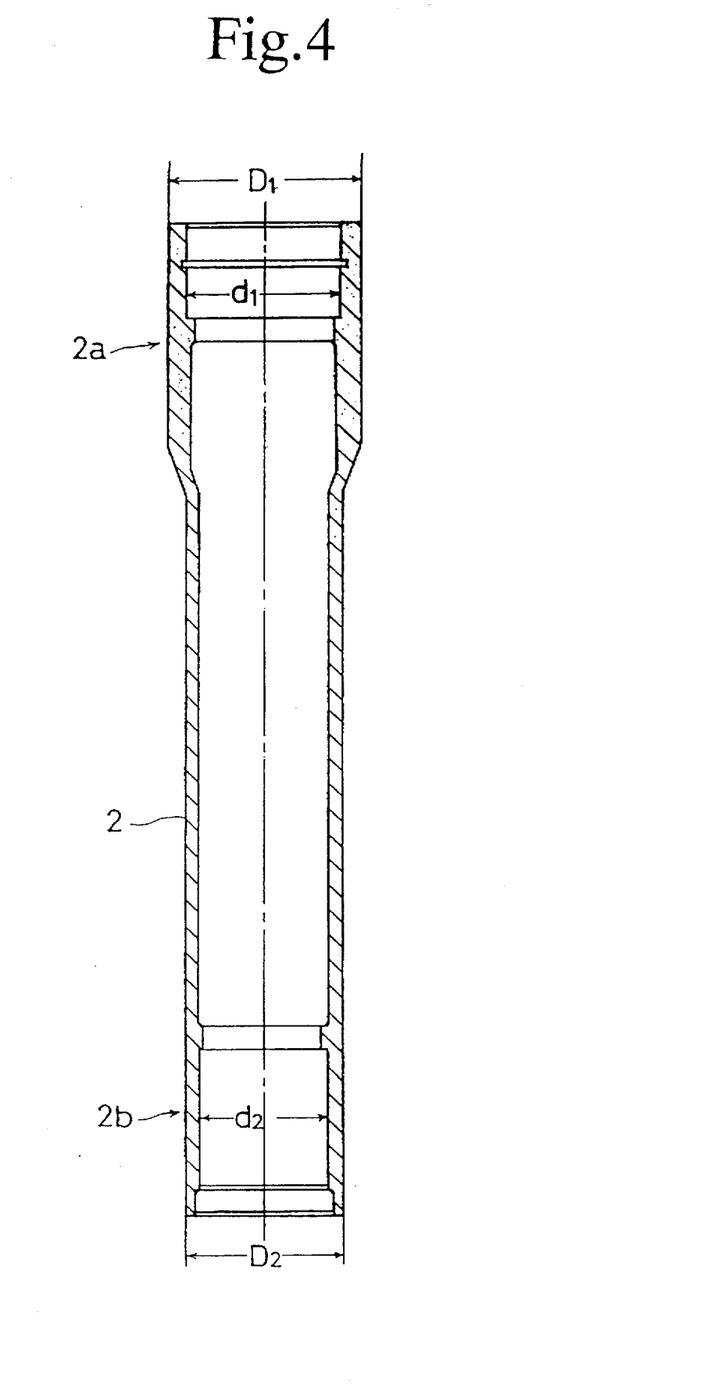
FIG. 4 is a longitudinal sectional view of a pivot pipe.

Accordingly, as shown in FIG. 4, the inside diameter $d_1$ of the right end 2a of the pivot pipe 2 in which the ball bearing 5 having a comparatively large outside diameter is fitted is greater than the inside diameter $d_2$ of the left end 2b of the pivot pipe 2 in which the needle bearing 4 having a comparatively small outside diameter is fitted. Consequently, the outside diameter $D_1$ of the right end 2a is greater than the outside diameter $D_2$ of the left end 2b. The pivot pipe 2 is a single member completed by expanding one end of a single pipe by press working to form the right end 2a instead of welding together a plurality of parts.

FIGS. 5(a)–5(f) show sequential stages of a process of fabricating the pivot pipe 2. This process may be referred to as pressing, press-working, ironing, ironing drawing, or similar phrases.

Figure 5A:
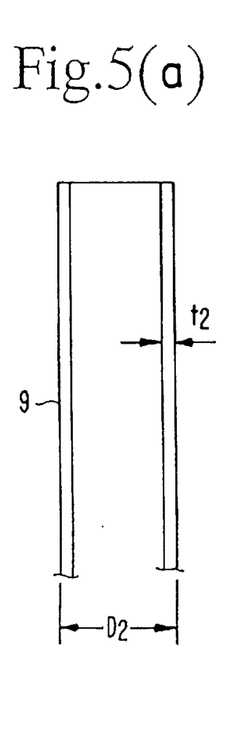
FIGS. 5(a) through 5(f) are fragmentary partially sectional views illustrating a process of fabricating a pivot pipe.
Figure 5B:
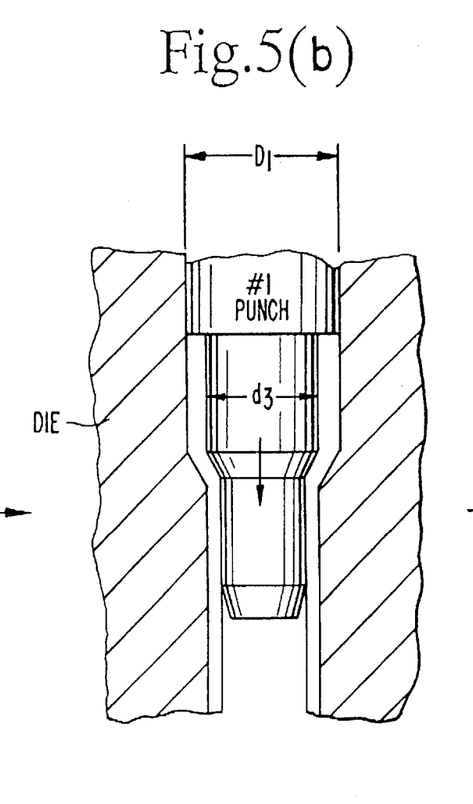
Figure 5C:
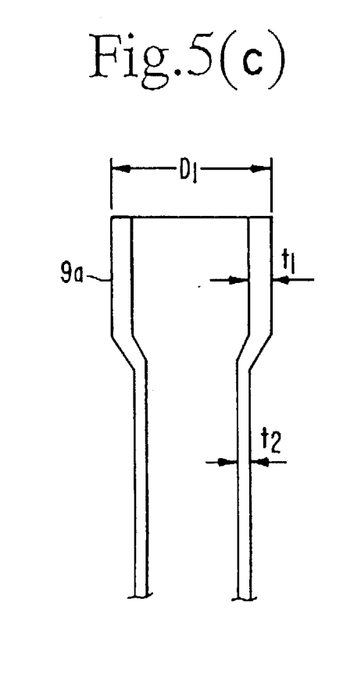

Originally, the pipe has a predetermined length, a wall thickness $t_2$, a uniform inside diameter, and an outside diameter $D_2$, as shown in FIG. 5(a). During the first stage of the process, an outer die is placed on one end of the pipe 9. A first portion of a first inner punch having an outside diameter $d_3$ larger than said inside diameter of said pivot pipe is pressed along a longitudinal axis of the pipe 9 to form an expanded part 9a having an outside diameter $D_1$, and an inside diameter $d_3$, thereby forming a first expanded diameter portion, as shown in FIG. 5(b). During this first stage of the process, the end of the pipe 9 is compressed axially while forming the expanded part 9a. As a result, the wall thickness $t_1$ of the expanded part 9a is greater than the original wall thickness $t_2$ of the pipe 9, as shown in FIG. 5(c). Further, the overall length of the pipe 9 is less than its original predetermined length due to the axial compression of the pipe 9.

Figure 5D:
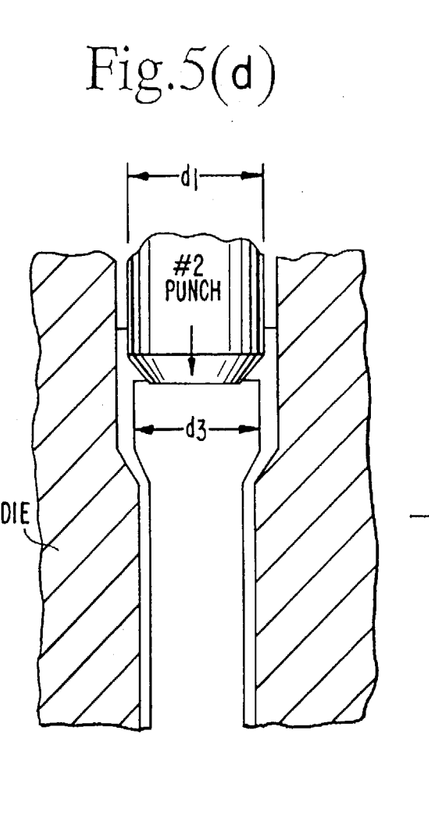

Next, a second stage of the process is implemented whereby a flange is initially formed in the expanded part 9a so as to extend inwardly from an interior sidewall of the expanded part 9a. A second inner punch having an outside diameter $d_1$ which is greater than the outside diameter $d_3$ of the first portion of the first punch, is pressed along the longitudinal axis of the pipe 9, as shown in FIG. 5(d). As a result, a flange 12 begins to form on the interior sidewall of the expanded part 9a, and a second expanded diameter portion is formed in the interior of the expanded part 9a to an inner diameter $d_1$, corresponding to the outside diameter of the ball bearing 5 to be received therein. The flange 12 separates the first expanded diameter portion having a diameter $d_3$ from the second expanded diameter portion having a diameter $d_1$.

Figure 5E:
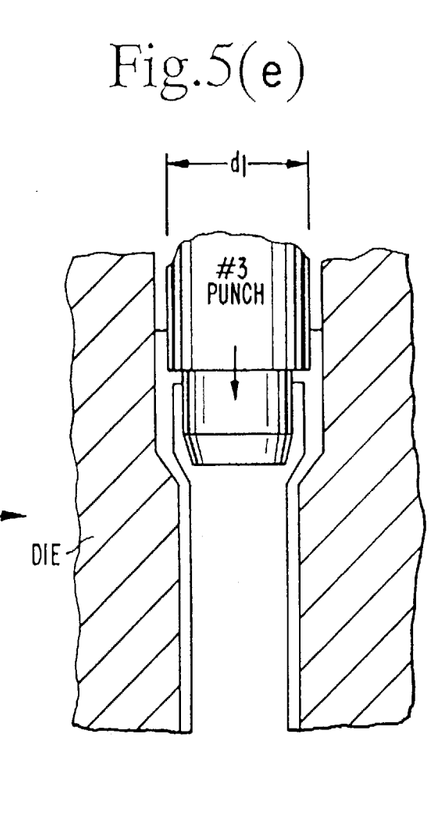
Figure 5F:
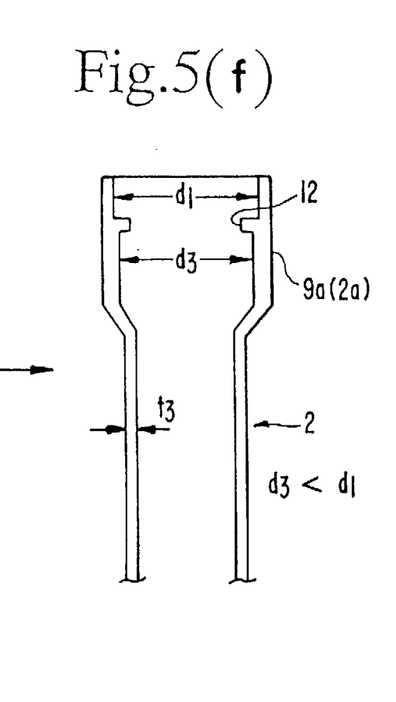

Finally, a third stage of the process is implemented whereby the flange is finished. During this third stage, a third inner punch is pressed along the axis of the pipe 9 so as to complete the formation of the flange 12 extending inwardly from the inner sidewall of both the first expanded diameter portion and the second expanded diameter portion of the expanded part 9a, as shown in FIG. 5(e). Alternatively, the third stage of the process may be implemented by a cutter such as a lathe, whereby certain material is removed from the interior of the expanded part 9a in order to finish the flange. The result of the three stages of the process is shown in FIG. 5(f).

A flange is formed in the second end of the pivot pipe in a similar manner. The inner circumference of the other end of the pipe 9 is finished in an inside diameter $d_2$, as illustrated in FIG. 4, corresponding to the outside diameter of the needle bearing 4 to complete the pivot pipe 2. The expanded part 9a serves as the right end 2a, and the other end serves as the left end 2b. When ironing the inner circumference of the expanded part 9a, the inner circumference of the middle part between the opposite ends of the pipe 9 may be ironed to reduce the wall thickness $t_2$ of the middle part to a wall thickness $t_3$ smaller than $t_2$.

Thus, the lightweight, strong pivot pipe 2 can entirely be formed by a simple process of press working the pipe at a comparatively low cost. Since the workpiece is not exposed to welding heat, the workpiece is not strained by heat and the quality of the constructed pivot pipes does not vary very widely.

The cross member 6 of the pivot pipe 2 in this embodiment also is a single member formed by press working. In FIG. 3, indicated at 6a is the cross section of the middle part of the cross member 6 and at 6b is the cross section of the opposite ends of the same. The cross member 6 is formed by flaring the opposite ends of a round pipe having a sectional shape substantially similar to the shape of the cross section 6a by press working, and then forming the flared ends in a rectangular shape. As shown in FIG. 2, the rear wall 6c of the cross member 6 is curved from end to end in a gentle curve. The flared ends curved as shown in FIG. 2 enhance the rigidity of the cross member 6 and facilitate press working.

Figure 6:
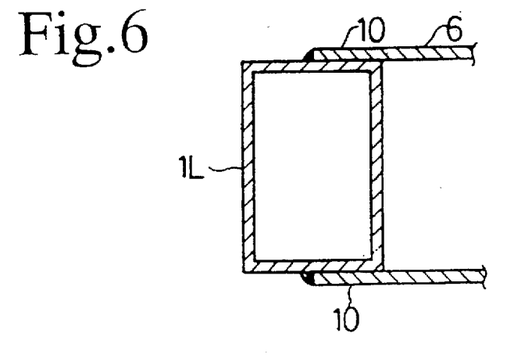
FIG. 6 is a sectional view taken on line VI—VI in FIG. 2.
Figure 7:
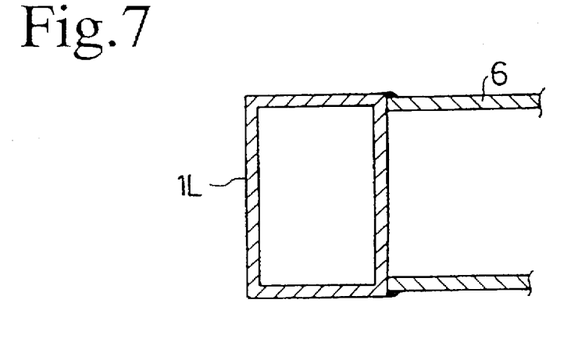
FIG. 7 is a sectional view, similar to FIG. 6, of a part of a rear fork in a second embodiment according to the present invention.
Figure 8:
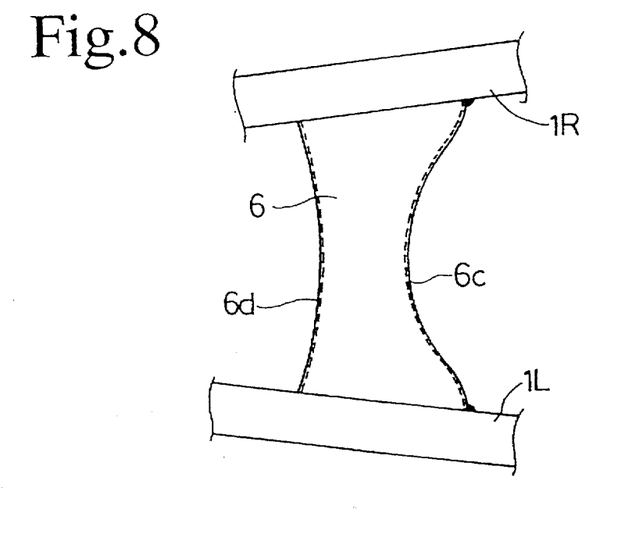
FIG. 8 is a plan view of a modification of the cross member.

The upper and lower walls of the cross member 6 extends outward to form extensions 10 so as to extend along the upper and lower surfaces of the swing arms 1R and 1L, and the extensions 10 are welded by boxing to the swing arms 1R and 1L as shown in FIG. 6. It is also possible to cut the opposite ends of the cross member 6 so as to conform to the inner side surfaces of the swing arms 1R and 1L and to weld the opposite ends to the inner side wall of the swing arms 1R and 1L as shown in FIG. 7. Both the front wall 6d and the rear wall 6c of the cross member 6 may be curved end to end in curves as shown in FIG. 8.

As is apparent from the foregoing description, the pivot pipe of the rear fork of the present invention for a motorcycle can be formed by a simple process at comparatively low cost in a lightweight construction having a high strength, and the quality of the pivot pipe does not vary very widely.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of forming a rear fork for a motorcycle comprising the steps of:

selecting a pivot pipe having a first end, a second end, a longitudinal axis, a substantially uniform wall thickness, and a substantially uniform inside diameter;

placing said first end of said pivot pipe in a die;

pressing a first portion of a first punch into said first end of said pipe in a direction along said longitudinal axis of said pipe, said first portion having an outside diameter larger than said inside diameter of said pivot pipe, thereby increasing an inside diameter of said first end of said pivot pipe to a first expanded diameter to form a first expanded diameter portion;

retaining said first end of said pivot pipe in said die while pressing a second punch into said first end of said pipe in a direction along said longitudinal axis of said pipe, said second punch having an outside diameter larger than said first portion of said first punch, thereby increasing the inside diameter of a portion of said first end of said pivot pipe to a second expanded diameter to form a second expanded diameter portion while maintaining said outside diameter of the first portion fixed to thereby form a flange in said first end of said pivot pipe between said first expanded diameter portion and said second expanded diameter portion such that said flange extends inwardly from each sidewall surface which forms said first expanded diameter portion and said second expanded diameter portion.

2. The method of forming a rear fork for a motorcycle according to claim 1, and further including the steps of maintaining the second end of said pivot pipe at the substantially uniform inside diameter for accommodating a needle bearing mounted on a pivot shaft, and selecting the dimensions of the second expanded diameter portion for accommodating a ball bearing mounted on the pivot shaft.

3. The method of forming a rear fork for a motorcycle according to claim 1, wherein the first recited pressing step increases the inside diameter of the first end of the pivot pipe for a predetermined length from said first end of the pivot pipe toward the second end of the pivot pipe.

4. The method of forming a rear fork for a motorcycle according to claim 1, wherein the first recited pressing step includes axially compressing the first end of said pivot pipe for deforming the substantially uniform wall thickness of the pivot pipe to form said first end relative to said thickness relative to said substantially uniform wall thickness.

5. The method of forming a rear fork for a motorcycle according to claim 1, and further including the step of finishing the inside diameter of said first end of said pivot pipe to accommodate a ball bearing.

6. The method of forming a rear fork for a motorcycle according to claim 1, wherein the step of forming the flange further includes the step of positioning the flange within said first end of said pivot pipe for accurately mounting a ball bearing mounted on a pivot shaft.

7. The method of forming a rear fork for a motorcycle according to claim 1, and further including the step of reducing a thickness of a central portion of said pivot pipe positioned between the first end and the second end of said pivot pipe.

8. The method of forming a rear fork for a motorcycle according to claim 1, and further including the step of forming a second flange positioned within said second end of said pivot pipe for accurately mounting a needle bearing mounted on a pivot shaft.

9. The method of forming a rear fork for a motorcycle according to claim 1, and further including the step of axially compressing the first end of said pivot pipe with a second portion of said first punch during said step of pressing a first portion of a first punch into said first end of said pipe.

10. The method of forming a rear fork for a motorcycle according to claim 9, wherein said second portion of said first punch is non-movable with respect to said first portion of said first punch.

11. The method of forming a rear fork for a motorcycle according to claim 1, further including the step of utilizing a cutter to remove material from an interior of the second expanded diameter portion in order to finish the flange.

12. A method of forming a rear fork for a motorcycle comprising the steps of:

selecting a pivot pipe having a first end, a second end, a longitudinal axis, a substantially uniform wall thickness between said first end and said second end, a substantially uniform outside diameter, and a substantially uniform inside diameter;

placing said first end of said pivot pipe in a die;

pressing a first portion of a first punch into said first end of said pivot pipe in a direction along said longitudinal axis of said pipe while axially compressing said first end of said pivot pipe with a second portion of said first punch, said first portion having an outside diameter larger than said inside diameter of said pivot pipe, thereby increasing an inside diameter of said first end of said pivot pipe to a first expanded diameter to form a first expanded diameter portion with an enlarged thickness relative to said substantially uniform wall thickness;

pressing a second punch into said expanded diameter portion of said first end of said pivot pipe in a direction along said longitudinal axis of said pivot pipe, said second punch having an outside diameter larger than said first portion of said first punch, thereby increasing the inside diameter of a portion of said first end of said pivot pipe to a second expanded diameter to form a second expanded diameter portion, and thereby partially forming a flange in said first end of said pivot pipe between said first expanded diameter portion and said second expanded diameter portion; and pressing a third punch into said second expanded diameter portion of said first end of said pivot pipe in a direction along said longitudinal axis of said pivot pipe to finish forming said flange such that said flange extends inwardly from each sidewall surface which forms said first expanded diameter portion and said second expanded diameter portion.

13. The method of forming a rear fork for a motorcycle according to claim 12, and further including the step of retaining said first end of said pivot pipe in said die during each of the first, second, and third recited pressing steps.

14. The method of forming a rear fork for a motorcycle according to claim 12, wherein the first recited pressing step increases the inside diameter of the first end of the pivot pipe for a first length from said first end of the pivot pipe toward the second end of the pivot pipe, and wherein the second recited pressing step increases the inside diameter of the first end of the pivot pipe for a second length less than said first length.

15. The method of forming a rear fork for a motorcycle according to claim 12, wherein said second portion of said first punch is non-movable with respect to said first portion of said first punch.

* * * * *